United States Patent [19]

Herkes

[11] 3,929,882
[45] Dec. 30, 1975

[54] N,N',N'',N'''-TETRASUBSTITUTED MALONAMIDINES AND SALTS

[75] Inventor: Frank Edward Herkes, Wilmington, Del.

[73] Assignee: E. I. Du Pont de Nemours & Co., Wilmington, Del.

[22] Filed: Jan. 13, 1972

[21] Appl. No.: 217,933

[52] U.S. Cl.......... 260/564 R; 260/45.9 R; 260/309; 260/309.2; 260/618 D; 260/649 F; 260/650 F; 260/651 F; 260/801; 8/21 C
[51] Int. Cl.²......................................... C07C 123/00
[58] Field of Search ................................ 260/564 R

[56] References Cited
FOREIGN PATENTS OR APPLICATIONS
1,197,929  8/1970  United Kingdom................. 260/564

OTHER PUBLICATIONS
Moszew et al., "Chemical Abstracts," Vol. 55, p. 15383, (1961).

Primary Examiner—R. V. Hines

[57] ABSTRACT

Disclosed herein are compounds (salts) of the formula

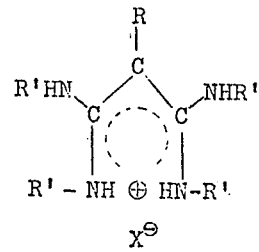

wherein:
R and R', alike or different, are selected from hydrocarbyl groups of 1 to 14 carbons and monosubstituted hydrocarbyl groups of 1 to 14 carbons, adjacent R' groups can be a hydrocarbyl 2 carbon chain diradical, and
X is chlorine or fluorine.

Also disclosed are the free bases formed by treating the salt with a base. The salt compounds are prepared by reaction of $RC(CF_2X)=CF_2$ with a primary amine.

16 Claims, No Drawings

N,N′,N″,N‴-TETRASUBSTITUTED MALONAMIDINES AND SALTS

BACKGROUND OF THE INVENTION

1. Field of the Invention

The compounds of this invention are malonamidinium compounds having hydrocarbyl groups or substituted hydrocarbyl groups attached by carbon to each of the nitrogens and to the central malonic carbon atom.

2. Description of the Prior Art

No malonamidines are known that have hydrocarbyl groups attached by carbon to each of the nitrogens as well as to the center malonic carbon (β- or 2-carbon).

SUMMARY OF THE INVENTION

The novel salts of this invention are represented by the formula

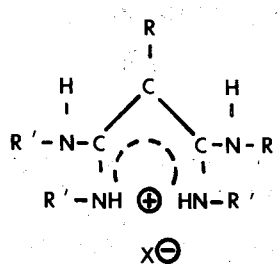

and the novel free bases formed by removal of HX from the salts are represented by the formula

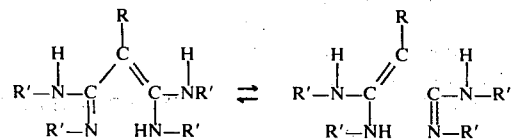

wherein
- R and R′ are alike or different and are selected from hydrocarbyl groups of 1 to 14 carbons and monosubstituted hydrocarbyl groups of 1 to 14 carbons, adjacent R′ groups can be a hydrocarbyl 2 carbon chain diradical, and
- X is fluorine or, preferably, chlorine, and the dotted line designates resonance.

R and R′ are preferably hydrocarbyl groups of 6 to 8 carbons and most preferably R is phenyl. The single substituent that can be attached to the hydrocarbyl groups is selected from one of the following groups: alkyl, alkoxy, perfluoroalkyl, alkylthio, perfluoroalkylthio, dialkylamino, chlorine and fluorine. Preferred divalent hydrocarbyl radicals as adjacent R′ groups contain up to 6 carbon atoms and include the o-phenylene and 1,2-ethylene diradicals.

By "hydrocarbyl" is meant a radical derived from a hydrocarbon by removal of a hydrogen atom. The term includes aryl groups derived from hydrocarbons having a benzene ring by removal of a nuclear hydrogen atom, alkaryl groups derived by removal of a nuclear hydrogen atom from a benzene ring having at least one alkyl side chain thereon, aralkyl groups wherein the hydrocarbyl group is formed by removal of an aliphatic hydrogen atom from a benzene compound having at least one alkyl side chain, cycloaliphatic groups derived from a hydrocarbon having a ring of three or more carbon atoms by removal of an aliphatic hydrogen atom, and alkyl groups derived from alkanes by removal of an aliphatic hydrogen atom. For the purpose of this invention, "hydrocarbyl" includes groups having aromatic unsaturation. Preferably, any other unsaturation that may be present is limited to ethylenic unsaturation.

The salt compounds are prepared by the novel reaction of a polyfluoroolefin of the formula $RC(CF_2X)=CF_2$, with a primary amine. The primary amine can be a hydrocarbyl monoamine or an arylene diamine. Suitable alkylamines that can be employed include methylamine, propylamine, decylamine, tetradecylamine, cyclohexylamine, cyclopentylamine, anthrylamine, allylamine, p-methylthioaniline, p-trifluoromethylthioaniline, and p-trifluoromethoxyaniline.

The base compounds are made from the salt compounds by removing HX therefrom in an additional step by treating the salt with a relatively strong base such as ammonium hydroxide, triethylamine, or basic ion exchange resins.

The ratio of polyfluoroolefin to primary amine is between about 1:3.5–4 to 1:8. When alkylamines are used, they remove HF as the amine salt ($RNH_2 \cdot NF$), and consequently, alkylamines are used in excess amounts of about 8:1 over the polyfluoroolefin.

Reaction temperatures are between about −50°C to 150°C with preferred temperatures of about 0°C to 50°C. The reaction is generally rapid although aromatic amines having electron withdrawing groups such as halogen tend to decrease the rate whereas aromatic amines having electrom releasing groups such as methoxyl tend to increase the reaction rate. Reaction times generally are about 1 to 24 hours.

Although not necessary, a compatible solvent (includes inert diluent) is preferably used. Suitable solvents include ethers, haloalkanes, dimethylformamide, dimethylsulfoxide, acetamide and hexamethylphosphorus triamide. Pressure resistant containers may be used when the amine or solvent has high vapor pressure.

DETAILS OF THE INVENTION

The 2-substituted perfluoropropenes that can be used in this reaction (Examples 13 and 14) are available by the procedure described by Herkes & Burton, J. Org. Chem., 32, 1311-8 (1967), wherein compounds of the formula $CF_3C(R) = CF_2$ are described, R being $C_6H_5$, $C_6H_5CH_2$, $C_6H_{11}$, p-$ClC_6H_4$, p-$FC_6H_4$, p$CH_3C_6H_4$, p-$CH_3OC_6H_4$, p$(CH_3)_2NC_6H_4$.

The method involves the reaction of polyfluorinated ketones with difluoromethylenetriphenylphosphorane, $(C_6H_5)_3P = CF_2$, generated in situ from sodium chlorodifluoroacetate and triphenylphosphine. By this method, other propenes can be obtained where R is alkyl such as methyl, butyl, hexyl, decyl, or tetradecyl as well as when R is anthracenyl or naphthyl and cycloaliphatic such as cyclopentyl.

In addition to the preferred hydrocarbyl monoradicals of 1–14 carbons, including aryl, alkyl, cycloalkyl, alkaryl or aralkyl, those containing groups that are nonreactive with primary amines can also be present such as alkoxy, perfluoroalkoxy, alkylthio, perfluoroalkylthio or dialkylamino including for R the groups p-trifluoromethoxyphenyl, p-methylthiophenyl, p-trifluoromethylthiophenyl, in addition to halogen such as chlorine or fluorine on aromatic carbon.

The 2-substituted aryl-3-chloro-1,1,3,3-tetrafluoropropene starting reactants (Examples 1–12 and 15–20) are prepared by reacting a Grignard reagent ArMgX with 1,3-dichloro-1,1,3,3-tetrafluoroacetone to produce the bis(chlorodifluoromethyl) substituted carbinol. This carbinol is converted to the corresponding chloride by means of thionyl chloride and pyridine. The chloride is then dechlorinated with $Zn/ZnCl_2$ in tetrahydrofuran.

Following is a method for preparing the 3-chloro-2-phenyl-1,1,3,3-tetrafluoropropene starting reactant employed in Examples 1–12 and 15–20; see, JACS, 92, 729 [1970]. In summary, a Grignard reagent is condensed with 1,3-dichloro-1,1,3,3-tetrafluoroacetone to produce the bis(chlorodifluoromethyl) substituted carbinol. The carbinol is converted to the corresponding chloride by means of thionyl chloride and pyridine, and the chloride is then dechlorinated as above.

To make the 3-chloro-2-phenyl-1,1,3,3-tetrafluoropropene: Into a 1-liter, 3-necked, round-bottom flask (flamed and cooled under $N_2$), equipped with a mechanical stirrer, condenser, thermometer and pressure-equalized dropping funnel, is added under $N_2$ one bottle of commercial phenylmagnesium bromide (1.0 mole) and 75 ml ether. To this solution is added 140 ml (319.4g, 1.55 moles) of dichlorotetrafluoroacetone dropwise at 10°–15° (external cooling necessary) over a 6 hr. period. After the addition, the solution is allowed to stand overnight at 25°. Temperatures are in degrees Centigrade.

The mixture is poured onto 600 g crushed ice containing 600 ml 10% HCl. The layers are separated and the aqueous layer extracted with ether (3 × 75 ml). The extracts are combined with the organic layer and dried over $MgSO_4$.

Removal of the solvent followed by distillation on a 8 cm Vigreux column yields 262 g (94%), bp 103°/17 mm of bis(chlorodifluoromethyl) benzyl alcohol.

A mixture of 100 g (0.36 mole) of bis(chlorodifluoromethyl) benzyl alcohol, 233 g (1.87 moles) of thionyl chloride and 7.9 g (0.10 mole) pyridine is refluxed 6 days. The excess thionyl chloride is removed, and the residue filtered. Ether (300 ml) is added to the filtrate and this solution washed with 1% $NaHCO_3$ (2 × 30 ml) cold water (4 × 30 ml) followed by drying over $MgSO_4$. The drying agent and solvent are removed and the residue distilled in a 36 cm spinning band yielding 85 g (80%) bp 96°/12 mm.

Anal. Calc'd for $C_9H_5Cl_3F_4$: C, 36.55; H, 1.69; F, 25.71. Found: C, 36.87; H, 2.02; F, 24.38.

A mixture of 21 g zinc dust and 3 g zinc chloride in 300 ml tetrahydrofuran is treated dropwise at 25° with a solution of 30 g (0.10 mole) of the above chloride in 50 ml tetrahydrofuran. The mixture is refluxed for 2 hr., cooled and filtered. The filtrate is added to 1000 ml ice water, followed by extracting with 1,1,2-trichloro-1,2,2-trifluoroethane (5 × 75 ml portions) and dried over $MgSO_4$. The solvent and drying agent are removed, and residue distilled on a 36 cm spinning band to yield 14–16 g (62–71%) of 3-chloro-2-phenyl-1,1,3,3-tetrafluoropropene, bp 57%/16 mm.
$N_D^{25°}$ 1.4809.
IR (Neat); 5.80μ ($C=CF_2$).
$^1$Hnmr ($CCl_4$), 7.28 (s, phenyl).

$^{19}$Fnmr ($CCl_4$) 46.8 ppm (doublet of doublets), 76.2 ppm (doublets of triplets, JF-F = 12 Hz), 79.7 ppm (doublet of triplets, JF-F = 30.5 Hz), Jgem F=F = 9.2 Hz Anal. Calc'd for $C_9H_5C_1F_4$: C, 48.11; H, 2.23. Found: C, 48.00; 48.26; H, 2.66, 2.25.

DESCRIPTION OF THE PREFERRED EMBODIMENTS

The following Examples are meant to illustrate but not to limit the invention.

EXAMPLE 1

N,N',N'',N''',2-Pentaphenylmalonamidine-HCl Salt

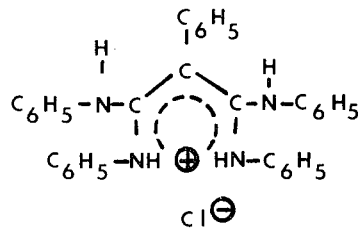

A solution of 5.0 g (0.023 mole) of 3-chloro-2-phenyl-1,1,3,3-tetrafluoropropene in 100 ml of ether is treated dropwise at 25° with a solution of 7.1 g (0.077 mole) of aniline in 75 ml ether. After 0.5 hr., the yellow solid is filtered. The solvent is removed to yield additional solid product. The combined solids are recrystallized from 1,2-dichloroethane containing sodium fluoride to yield 4.2 g (43%) of N,N',N'',N''',2-pentaphenylmalonamidine hydrochloride, m.p. 207°–209°.

UV ($CH_3OH$): 422 mμ ($\epsilon$ = 15,200), 310 mμ ($\epsilon$ = 25,600), 226 mμ ($\epsilon$ = 29,600).

Mass spectrum (m/e) calc'd for $C_{30}H_{26}N_4F_2$: 480.2125; obs, 480.2123.

$^1$Hnmr (DMSO-$d_6$)$^{TMS}$: δ 9.95 (s, NH), δ 7.08 (broad singlet, phenyl protons).

Anal. Calc'd for $C_{33}H_{28}N_4$·HCl: C, 76.67; H, 5.61; N, 10.84. Found: C, 77.16; H, 5.52; N, 10.73.

EXAMPLE 2

N,N',N'',N'''-2-Pentaphenylmalonamidine

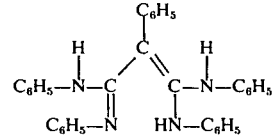

N,N',N'',N'''-2-Pentaphenylmalonamidine-HCl salt (crude) (8.2 g, 0.0159 mole) is suspended in 50 ml of 29% aqueous ammonium hydroxide and stirred at 40° for 1 hr. An insoluble tacky ball formed. This solid is added to 25 ml of acetonitrile and the resulting precipitate filtered and washed with acetonitrile to yield 3.4 g (44%) of the free base. Recrystallization from acetonitrile gave the N,N',N'',N'''-2-pentaphenylmalonamidine, m.p. 165°–166°.

$^1$Hnmr (CDCl$_3$)$^{TMS}$: δ 5.24 (s, 1H), δ 7.21 (s, phenyl), and a broad multiplet for remaining phenyls, 9.81 (broad, NH).

UV ($CH_3CN$): 263 mμ ($\epsilon$ = 26,800).

Mass spectrum (m/e) 480 (M)+.

EXAMPLE 3

N,N',N'',N'''-Tetra(2-fluorophenyl)-2-phenyl-malonamidine-HCl Salt

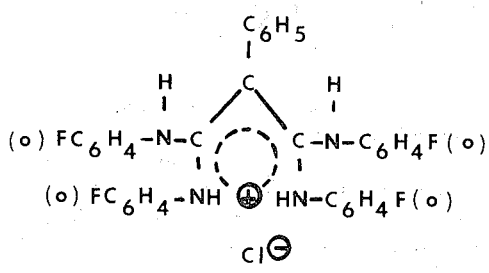

A solution of 2.4 g (0.0107 mole) of 3-chloro-2-phenyl-1,1,3,3-tetrafluoropropene in 50 ml ether is treated dropwise at 0.5° with a solution of 4.4 g (0.0392 mole) of 2-fluoroaniline in 25 ml ether. After stirring 1 hr. at 0°–5°, the solution is kept at 25° for ½ hr. Removal of the solvent yields a viscous oil which solidifies after standing 3 days. Recrystallization from 1,2-dichloroethane-hexane gives 3.6 g (58%) of N,N',N'',N'''-tetra(2-fluorophenyl)-2-phenylmalonamide hydrochloride which on recrystallization from 1,2-dichloroethane has m.p. 204°–206°.

UV (CH$_3$OH): 403 m$\mu$ ($\epsilon$ = 12,500), 296 m$\mu$ ($\epsilon$ = 21,400), 288 m$\mu$ ($\epsilon$ = 22,000).

$^1$Hnmr (DMSO-d$_6$)$^{TMS}$: $\delta$ 10.02 (s, NH), ~$\delta$ 7.0 (m, aromatic).

$^{19}$Fnmr (DMSO-d$_6$)$^{F}$11: $\delta$ 118.6 (s) - proton decoupled spectrum.

Anal. Calc'd for C$_{33}$H$_{24}$N$_4$F$_4$.HCl: C, 67.4; H, 4.25; N, 9.52. Found: C, 67.12; H, 4.36; N, 9.38.

EXAMPLE 4

N,N',N'',N'''-Tetra(2-fluorophenyl)-2-phenyl-malonamidine

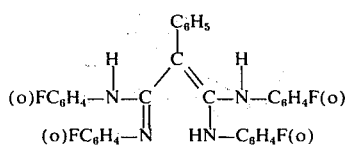

The above-named and described compound can be prepared from the HCl salt of Example 3 according to the general procedure as described in Example 2.

EXAMPLE 5

N,N',N'',N'''-Tetra(4-fluorophenyl)-2-phenyl-malonamidine-HCl Salt

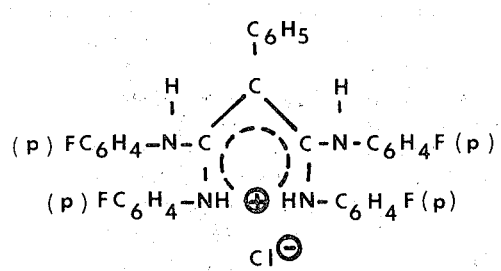

A solution of 2.4 g (0.0107 mole) of 3-chloro-2-phenyl-1,1,3,3-tetrafluoropropene in 50 ml ether is treated dropwise with a solution of 4.4 g (0.0392 mole) 4-fluoroaniline in 25 ml ether at 0°–5°. After stirring 1 hr. at 0°–5°, the mixture is allowed to warm to 25° for ½ hr. The solvent is removed in vacuo to yield 2.0 g (32%) of N,N',N'',N'''-tetra(4-fluorophenyl)-2-phenyl-malonamidine as the HCl salt. Recrystallization from 1,2-dichloroethane gives m.p. 241°–242°.

UV (CH$_3$OH): 415 m$\mu$ ($\epsilon$ = 13,500), 297 m$\mu$ ($\epsilon$ = 23,200), 224 m$\mu$ ($\epsilon$ = 23,100).

$^1$Hnmr (DMSO-d$_6$)$^{TMS}$: $\delta$ 10.05 (s, NH), ~$\delta$ 6.98 (m, phenyl).

$^{19}$Fnmr (DMSO-d$_6$)$^{F}$11: $\delta$ 119.1 (s) - proton decoupled.

Anal. Calc'd for C$_{33}$H$_{24}$N$_4$F$_4$.HCl: C, 67.4; H, 4.25; N, 9.52. Found: C, 67.13, 67.38; H, 4.30, 4.32; N, 9.41, 9.48.

EXAMPLE 6

N,N',N'',N'''-Tetra(4-fluorophenyl)-2-phenyl-malonamidine

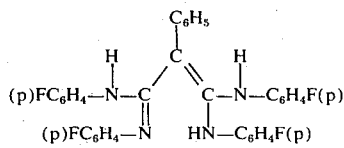

The above-named and described compound can be prepared from the HCl salt of Example 5 according to the general procedure as described in Example 2.

EXAMPLE 7

N,N',N'',N'''-Tetra(3-fluorophenyl)-2-phenyl-malonamidine-HCl Salt

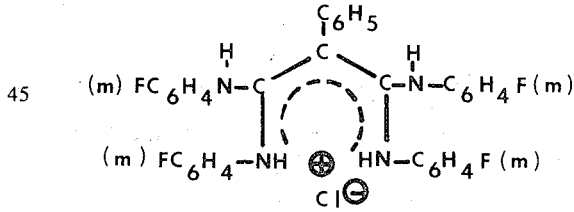

A solution of 2 g (8.5 mmoles) of 3-chloro-2-phenyl-1,1,3,3-tetrafluoropropene and 3.3 g (29.8 mmoles) 3-fluoroaniline in 50 ml ether is refluxed for 24 hr. The solvent is removed to yield an oil. After standing 17 hr., the oil crystalizes. Methanol (75 ml) is added, and the mixture filtered. Treatment of the filtrate with ether followed by filtration produces an additional crop to yield 2.7 g (61%) of N,N',N'',N'''-tetra(3-fluorophenyl)-2-phenylmalonamidine hydrochloride, m.p. 221°–223°.

UV (CH$_3$OH): 424 m$\mu$ ($\epsilon$ = 11,150), 305 m$\mu$ ($\epsilon$ = 25,100), sh 225 m$\mu$ ($\epsilon$ = 26,400).

$^1$Hnmr (DMSO-d$_6$)$^{TMS}$: $\delta$ 10.03 (s, NH), ~$\delta$ 7.05 (m, aromatic).

$^{19}$Fnmr (DMSO-d$_6$)$^{F}$11: $\delta$ 112.7 (s) - proton decoupled.

Anal. Calc'd for $C_{33}H_{24}N_4F_4 \cdot HCl$: C, 67.4; H, 4.24; N, 9.52. Found: C, 64.55; H, 4.59, 4.45; 64.88 N, 9.00, 9.10.

EXAMPLE 8

N,N′,N″,N‴,-Tetra(3-fluorophenyl)-2-phenyl-malonamidine

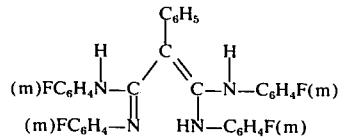

The above-named and described compound can be prepared from the HCl salt of Example 7 according to the general procedure as described in Example 2.

EXAMPLE 9

N,N′,N″,N‴-Tetra-p-tolyl-2-phenylmalonamidine-HCl Salt

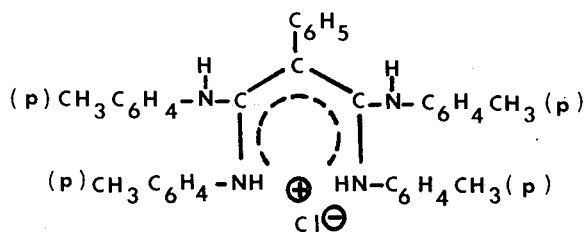

A solution of 2.4 g (0.0107 mole) of 3-chloro-2-phenyl-1,1,3,3-tetrafluoropropene in 50 ml ether is treated dropwise at 0°–5° with a solution of 4.2 g (0.0392 mole) of p-toludine in 25 ml ether. After stirring 1 hr. at 0°–5°, the solution is kept at 25° for ½ hr. The yellow solid is filtered and recrystallized from 1,2-dichloroethanehexane to yield 2.2 g (39%) of N,N′,N″,N‴-tetra-p-tolyl-2-phenylmalonamidine hydrochloride, m.p. 235°–237°.

UV (CH$_3$OH): 420 mμ ($\epsilon$ = 13,000), 313 mμ ($\epsilon$ = 22,100), 233 mμ ($\epsilon$ = 30,600).

Anal. Calc'd for $C_{37}H_{36}N_4 \cdot HCl$: C, 77.6; H, 6.47; N, 9.79. Found: C, 77.55; H, 6.62; N, 9.59.

EXAMPLE 10

N,N′,N″,N‴-Tetra-p-tolyl-2-phenyl-malonamidine

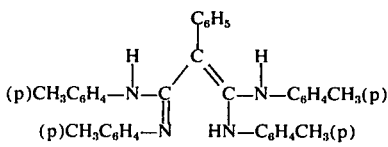

The above-named and described compound can be prepared from the HCl salt of Example 9 according to the general procedure as described in Example 2.

EXAMPLE 11

N,N′,N″,N‴-Tetra-(4-chlorophenyl)-2-phenyl-malonamidine-HCl Salt

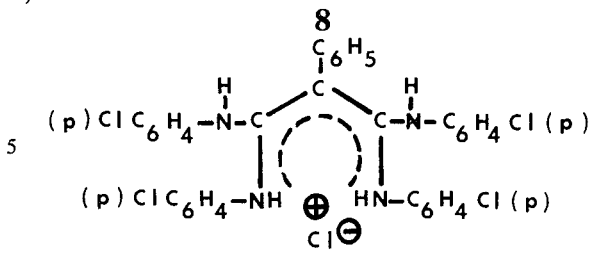

A solution of 2 g (8.5 mmole) of 3-chloro-2-phenyl-1,1,3,3-tetrafluoropropene in 25 ml ether is added at 25° to a solution of 4.8 g of 4-chloroaniline in 25 ml ether. The solution is refluxed for 20 hr., cooled, and the solvent removed to yield 3 g of yellow solid. Recrystallization from methanol-ether gave 1.6 g (43%) of N,N′,N″,N‴-tetra-(4-chlorophenyl)-2-phenyl-malonamidine hydrochloride, m.p. 224°–226°.

UV (CH$_3$OH): 430 mμ (10,250), 304 mμ (19,100), 240 mμ (33,300).

Anal. Calc'd for $C_{33}H_{24}N_4Cl_4 \cdot HCl$: C, 60.5; H, 3.82; N, 8.53. Found: C, 59.19; H, 3.86; N, 8.22.

EXAMPLE 12

N,N′,N″,N‴,-Tetra-(4-chlorophenyl)-2-phenyl-malonamidine

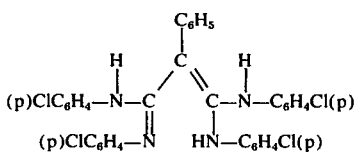

The above-named and described compound can be prepared from the HCl salt of Example 11 according to the general procedure as described in Example 2.

EXAMPLE 13

N,N′,N″,N‴,2-Pentaphenylmalonamidine-HF Salt

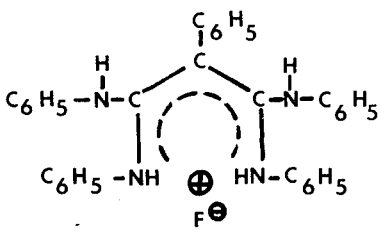

A mixture of 1.3 g (6.2 mmoles) of 2-phenyl-1,1,3,3,3-pentafluoropropene and 2.2 g (23.6 mmoles) aniline is heated 20 hr. at 80°. The cooled yellowish-brown solid is treated with ether and filtered to yield 0.82 g. Recrystallization from chloroform-ether yields the yellow N,N′,N″,N‴,2-pentaphenylmalonamidine hydrofluoride, m.p. 187°–189°.

UV (CH$_3$CN): 417 mμ ($\epsilon$ = 7,770), 292 mμ ($\epsilon$ = 14,600), 230 mμ ($\epsilon$ = 18,700).

$^1$Hnmr (DMSO-d$_6$)$^{TMS}$: δ 9.71 (broad s, NH), δ 7.06 (broad phenyl singlet with sh at δ 7.23).

Mass spectrum (m/e): 480 (M$^{+\cdot}$—HF), 387 (M—C$_6$H$_5$NH$_2$)$^+$, 287 (M—C$_{13}$H$_9$N$_2$)$^+$, 194 (M—HC(NHC$_6$H$_5$)=NC$_6$H$_5$)$^+$, 20 (HF, intense).

EXAMPLE 14

N,N',N'',N''',2-Pentaphenylmalonamidine

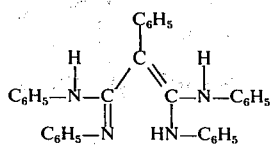

The above-named and described compound can be prepared from the HCl salt of Example 13 according to the general procedure as described in Example 2.

EXAMPLE 15

N,N',N'',N'''-Tetra(4-methoxyphenyl)-2-phenyl-malonamidine-HCl Salt

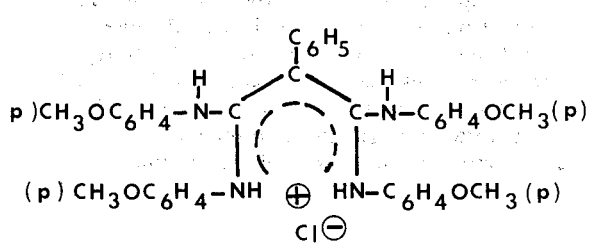

A solution of 2 g (0.0085 mole) of 3-chloro-2-phenyl-1,1,3,3-tetrafluoropropene in 25 ml ether is added to a stirred solution of 4.9 g (0.0298 mole) 4-anisidine in 25 ml ether at 25°. After refluxing for 2½ hr., the mixture is cooled and filtered to yield 4 g of yellow solid. Recrystallization from 1,2-dichloroethane gave 2.2 g (37%) of N,N',N'',N'''-tetra(4-methoxyphenyl)-2-phenylmalonamidine hydrochloride, m.p. 209°–210°.

UV (CH$_3$OH): 415 m$\mu$ ($\epsilon$ = 13,600), 303 m$\mu$ ($\epsilon$ = 26,600), 232 m$\mu$ ($\epsilon$ = 34,500).

Anal. Calc'd for C$_{37}$H$_{36}$N$_4$O$_4$.HCl: C, 69.8; H, 5.82; N, 8.81 Found: C, 68.17, 67.97; H, 5.89, 5.80; N, 8.74, 8.75

EXAMPLE 16

N,N',N'',N''',-Tetra(4-methoxyphenol)-2-phenyl-malonamidine

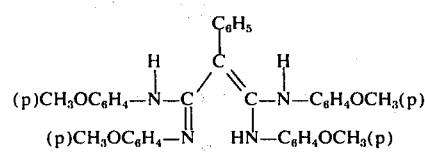

The above-named and described compound can be prepared from the HCl salt of Example 15 according to the general procedure as described in Example 2.

EXAMPLE 17

N,N',N'',N'''-Tetrabenzyl-2-phenylmalonamidine-HCl Salt

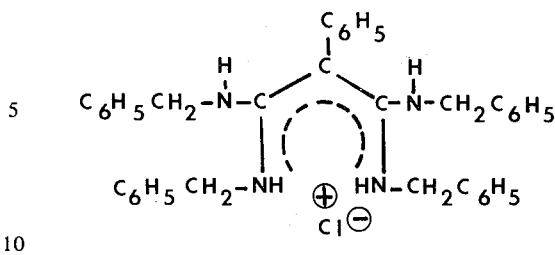

A solution of 4.4 g (0.020 mole) of 3-chloro-2-phenyl-1,1,3,3-tetrafluoropropene in 150 ml ether is treated dropwise (over 1.5 hr.) at 5° with a solution of 17.1 g (0.160 mole) benzylamine in 75 ml ether. After 1 hr. at 5°, the mixture is warmed to 25° and filtered. The filtered solid is added to 400 ml ice-water and stirred 1 hr. The insoluble product is filtered and dried on a clay plate to yield 3.73 g (32%) of the salt. Recrystallization from chloroform-hexane gave the N,N',N'',N'''-tetrabenzyl-2-phenylmalonamidine hydrochloride, m.p. 182°.

UV (CH$_3$CN): 341 m$\mu$ ($\epsilon$ = 9,640), 301 m$\mu$ ($\epsilon$ = 6,520), sh 235 m$\mu$ ($\epsilon$ = 17,500).

$^1$Hnmr (DMSO-d$_6$)$^{TMS}$: $\delta$ 4.01 (d, CH$_2$, 8H), $\delta$ 7.25 (s, with sh, phenyl 25H), $\delta$ 7.82 (broad doublet, NH) with $J_{H-NH}$ = ~5 Hz.

Mass spectrum (m/e): Calc'd for C$_{37}$H$_{37}$N$_4$: 536.2938; Obs., 536.2926 (M—HCl)$^+$.

Anal. Calc'd for C$_{37}$H$_{36}$N$_4$.HCl: C, 77.5; H, 6.46; N, 9.77. Found: C, 77.33; H, 6.39; N, 9.69.

EXAMPLE 18

N,N',N'',N''',-Tetrabenzyl-2-phenylmalonamidine

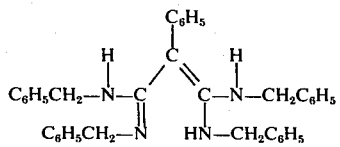

The above-named and described compound can be prepared from the HCl salt of Example 17 according to the general procedure as described in Example 2.

EXAMPLE 19

Dibenzimidazolylphenylmethane-HCl Salt

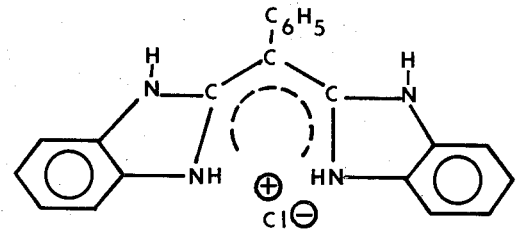

A mixture of 3 g of sodium fluoride in 50 ml of ether is treated dropwise with a solution of 3 g (0.0137 mole) of 3-chloro-2-phenyl-1,1,3,3-tetrafluoropropene in 75 ml of ether and a solution of 2.5 g (0.0231 mole) of o-phenylene diamine in 75 ml of ether from separate addition funnels at 25°. After standing 18 hr., the solids are filtered and added to 200 ml of water. The mixture is filtered and the resulting solid dried on clay plate to yield 1.5 g of dibenzimidazolylphenylmethane hydrochloride, m.p. 240°–248°.

Mass spectrum (m/e): 324 (M—HCl)$^+$ for C$_{21}$H$_{16}$N$_4$

EXAMPLE 20

Dibenzimidazolylphenylmethane

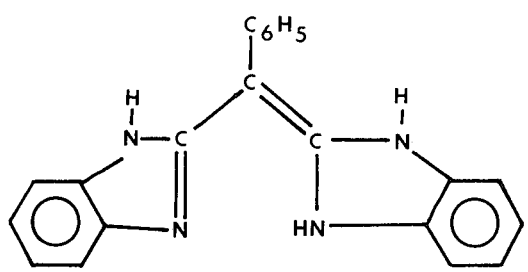

The above-named and described compound can be prepared from the HCl salt of Example 19 according to the general procedure as described in Example 2.

Utility

The novel base malonamidines of this invention have generic utility as antioxidants and cure promoters for elastomeric and thermosetting polymers. The novel salts, convertible to the base compounds as taught herein, are useful as curing agents in the conventional procedure of mixing with the rubbery material followed by standing, particularly at elevated temperatures, to effect cure.

Amidines are shown in the literature (see, for example, U.S. Pat. No. 3,018,266) as cure promoters for polymers in the presence of a peroxy catalyst. All of the novel malonamidine compounds and salts are useful as cure promoters whether they contain aromatic, aliphatic or cycloaliphatic hydrocarbyl groups and whether they are monosubstituted or not. They can be used in amounts of between about 0.2 to 5% by weight of the polymer. The polymer to be cured is rubbery in nature and preferably has ethylenic unsaturation as illustrated by isoprene, butadiene or chloroprene polymers or copolymers.

The compound of Example 2 when compounded in an amount of 1–5% with chloroprene polymer provides antioxidant protection, particularly against attack by ozone. For promoting the cure of chloroprene, butadiene-styrene, or natural rubber, compounds such as those of Example 1 are employed in an amount of 0.5–1% of the rubber with a thiazole, zinc oxide and sulfur and added inert fillers (carbon black, clay, silica, magnesia, etc.) at a curing temperature of 150°–160°C for 10 to 20 minutes.

The pentaaromatic malonamidine salts taught herein are yellow and fluorescent and can be used as textile dyes. For example when N,N',N'',N''',2-pentaphenylmalonamidine hydrochloride was viscous milled and dispersed in water, then applied at a strength of 100g/l to polyester/cotton blend fabric by dry heat fixation, the fabric was dyed a light yellow.

The embodiments of the invention in which an exclusive property or privilege is claimed are defined as follows:

1. A compound selected from the group consisting of

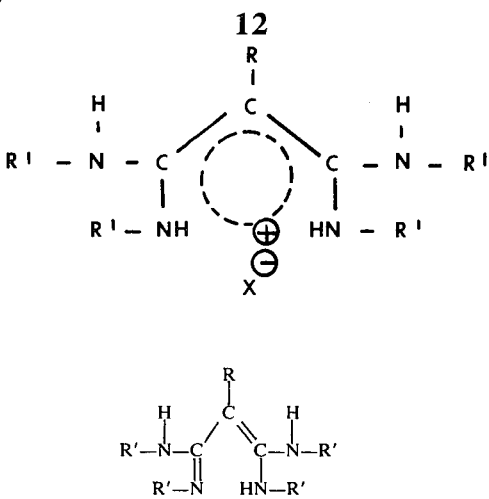

and wherein R and R', alike or different, are selected from the group consisting of alkyl, aryl, alkaryl, aralkyl and cycloalkyl groups of 1 to 14 carbons and monosubstituted derivatives thereof in which the substituent is selected from the group consisting of alkoxy, perfluoroalkoxy, alkylthio, perfluoroalkylthio, dialkylamino, chlorine and fluorine, X is chlorine or fluorine, and the dotted line designates resonance.

2. A compound of claim 1 of the formula

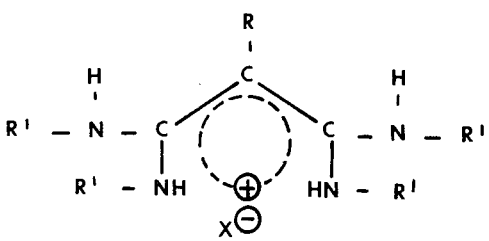

3. A compound of claim 2 wherein R is phenyl.
4. A compound according to claim 3 of the formula

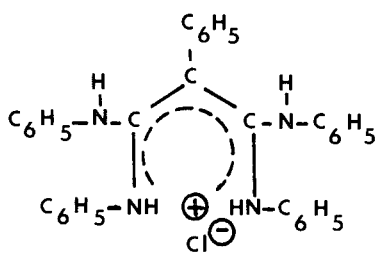

5. A compound according to claim 3 of the formula

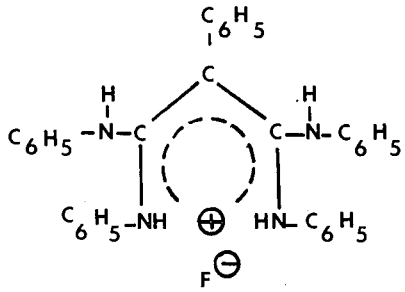

6. A compound according to claim 3, wherein R' is fluorophenyl.

7. A compound according to claim 3, wherein R' is chlorophenyl.

8. A compound according to claim 3, wherein R' is alkylphenyl.

9. A compound according to claim 3, wherein R' is alkoxyphenyl.

10. A compound of claim 1 of the formula

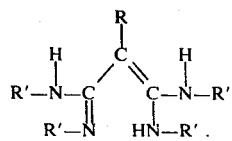

11. A compound of claim 10 wherein R is phenyl.

12. A compound according to claim 11 of the formula

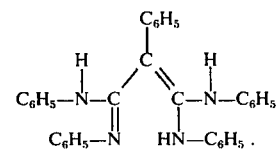

13. A compound according to claim 11, wherein R' is fluorophenyl.

14. A compound according to claim 11, wherein R' is chlorophenyl.

15. A compound according to claim 11, wherein R' is alkylphenyl.

16. A compound according to claim 11, wherein R' is alkoxyphenyl.

* * * * *